G. H. BRUSH.
UNIVERSAL JOINT.
APPLICATION FILED APR. 18, 1911.
1,037,427.
Patented Sept. 3, 1912.
2 SHEETS—SHEET 1.
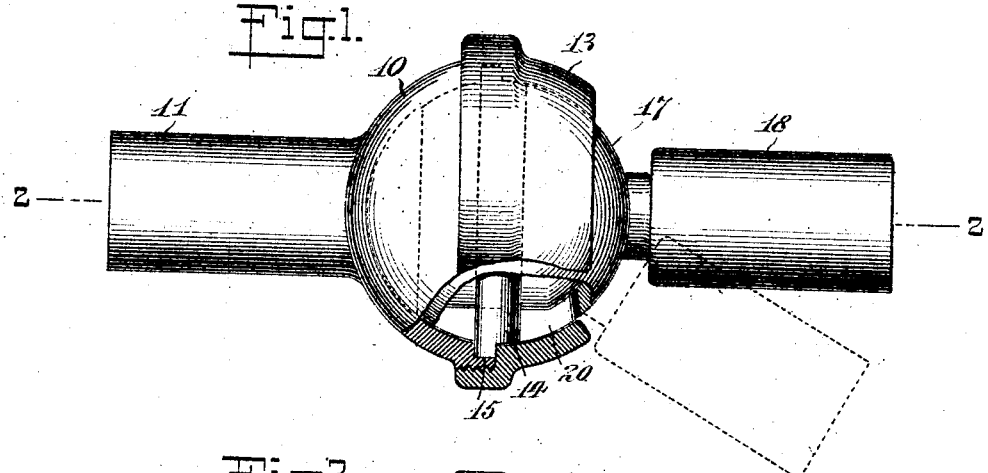
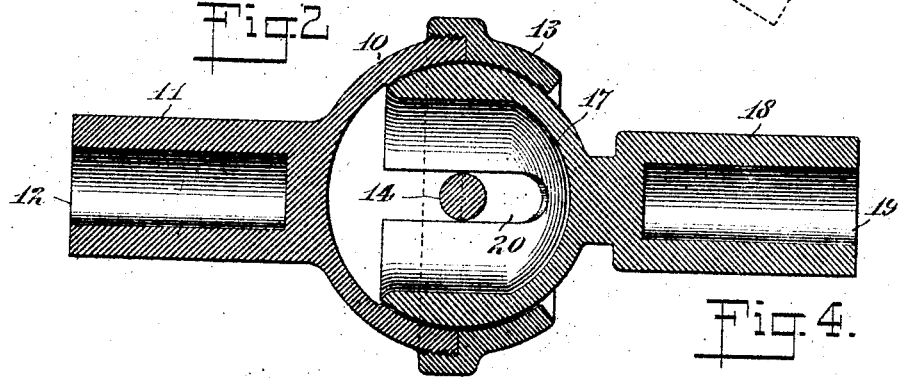
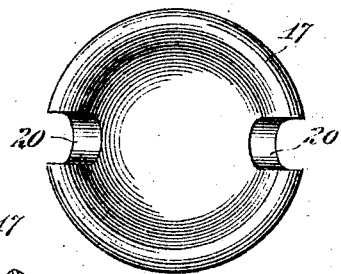
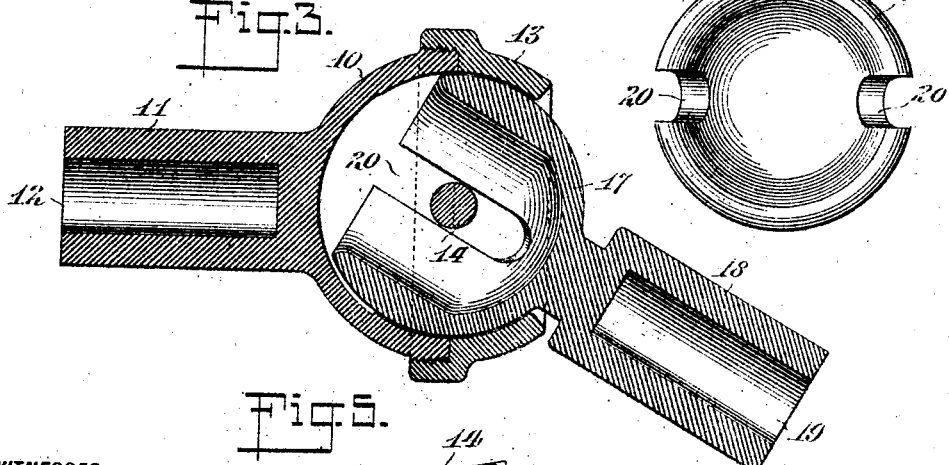
WITNESSES:
R. A. Flint
A. V. Walsh
INVENTOR
George H. Brush
BY George Bevr
ATTORNEY G. H. BRUSH.
UNIVERSAL JOINT.
APPLICATION FILED APR. 18, 1911.
1,037,427.
Patented Sept. 3, 1912.
2 SHEETS—SHEET 2.
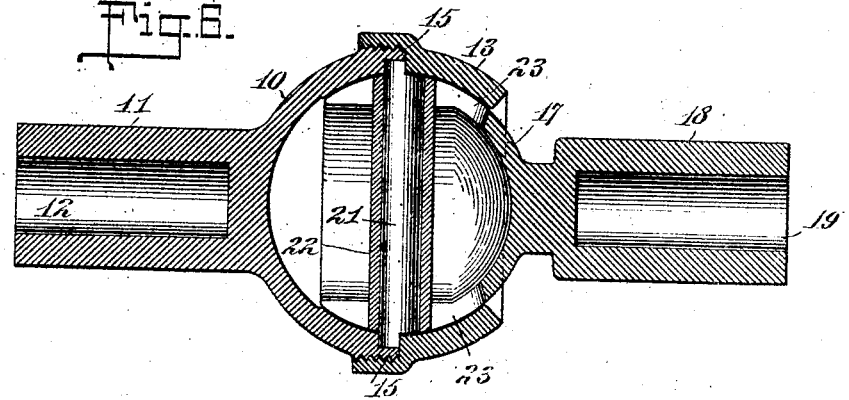
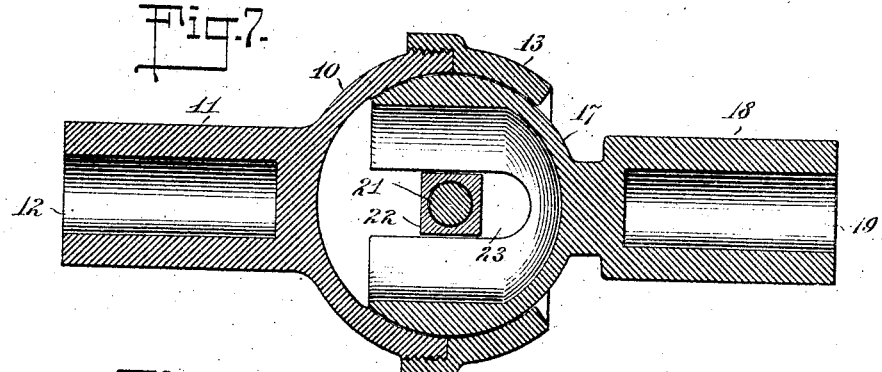
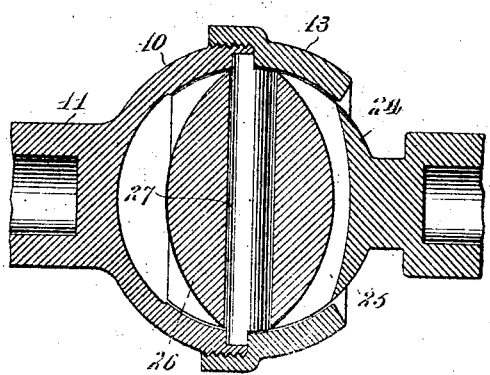
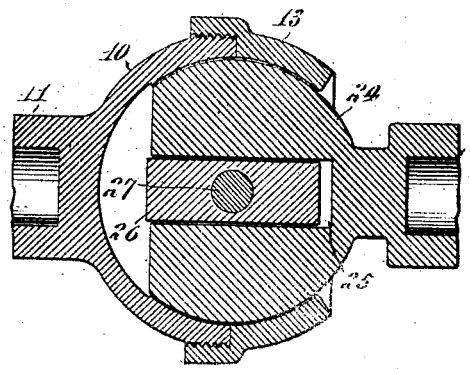
WITNESSES:
R. N. Flint
A. V. Walsh
INVENTOR
George H. Brush
BY George Beck
ATTORNEY

UNITED STATES PATENT OFFICE.

GEORGE H. BRUSH, OF CHICAGO HEIGHTS, ILLINOIS, ASSIGNOR OF ONE-THIRD TO WESLEY G. NICHOLS, OF CHICAGO HEIGHTS, ILLINOIS.

UNIVERSAL JOINT.

1,037,427.  Specification of Letters Patent.  Patented Sept. 3, 1912.

Application filed April 18, 1911. Serial No. 621,926.

*To all whom it may concern:*

Be it known that I, GEORGE H. BRUSH, a citizen of the United States, and a resident of Chicago Heights, in the county of Cook and State of Illinois, have made and invented certain new and useful Improvements in Universal Joints, of which the following is a specification.

My invention relates to an improvement in universal joints adapted for use in coupling or joining shafts, for the purpose of transmitting motion from one to the other, and also adapted for all of the purposes for which universal joints of this type are applicable, the objects being to provide a device of this character which will be free from projecting parts likely to catch the clothing, or injure a person who may come into contact with it; to provide a universal joint in which the oil for lubricating purposes will be retained within the same because of its structural features, and without the provision of special oil-retaining means; to provide a universal joint which will be simple in construction and effective for the purpose for which it is designed, and one which may be readily manufactured and easily assembled and disassembled; and to provide such other improvements in and relating to universal joints as are hereinafter disclosed and shown in the drawing accompanying and forming a part of this application.

With the objects above enumerated in view, my invention consists in the improved universal joint shown in the accompanying drawing and hereinafter described and claimed, and in such variations and modifications thereof as will be obvious to those skilled in the art to which my invention relates.

In the drawing: Figure 1 is a view showing my improved universal joint in side elevation, with a portion broken away to illustrate certain features of the interior construction thereof; Fig. 2 is a view showing a section upon a longitudinal central plane indicated by the line 2—2, Fig. 1; Fig. 3 is a similar view showing the two principal members of the joint inclined with reference to one another; Fig. 4 is a view showing the ball member of the joint as seen looking into it; Fig. 5 is a view showing a connecting pin in perspective; Fig. 6 is a view showing a section upon a longitudinal central plane of another form of my improved universal joint; Fig. 7 is a similar view upon a plane at right angles to the plane of Fig. 6, and Figs. 8 and 9 are views similar to Figs. 6 and 7 and showing still another form of my improved universal joint.

In the drawings, 10 is the hollow socket member of my improved universal joint, and 11 a sleeve portion formed preferably in one piece therewith and to which the end of a shaft, not shown, is connected, as by means of a recess 12 into which the end of said shaft projects. The socket member 10 is formed in two parts, and is shown as provided with a detachable portion 13, preferably in threaded engagement with the member 10, the inner surface of the latter and detachable portion 13 thereof being spherical in form. Diametrically across the socket member extends a pin 14, the ends of which lie in recesses 15, formed in the inner surface thereof, the ends of said pin being preferably cut away as shown at 16, Fig. 5, in order to prevent the same from rotating in the bearings for the ends thereof formed by the recesses 15. The said pin is thus held in position by the detachable portion 13 of the socket member, as will be understood, and, as the same occupies a constant and fixed position relative to the socket member, rotary motion may be transmitted to or from the said member through the pin.

The reference character 17 designates a ball member spherical in form and preferably hollow so as to provide a considerable space within the joint for containing oil as shown in Figs. 1 to 7, the diameter of said ball member being such that it fits closely within the socket member, while at the same time being free to move angularly therein, said ball member being provided with a sleeve 18 having a recess 19, similar to the sleeve 11 and recess 12 of the socket member. The said ball member is provided with two diametrically disposed slots 20 within which the pin 14 lies when the parts are properly assembled, the slots being long enough, (see Figs. 1, 6 and 8) to permit of an upward or downward movement of the ball member, as will be understood.

In Figs. 6 and 7, the pin 21 is shown as surrounded by a square sleeve 22 which turns freely upon the pin, the slots 23 of the ball member being made wide enough to accommodate the same.

In Figs. 8 and 9, the hollow form of the ball member is departed from; a ball member 24 is provided having a transverse slot 25, within which a sleeve 26 is located, said sleeve being loose upon a pin 27 similar in function to the pins 21 and 14 above referred to, the pins being held in the socket member in the same way in all the forms of my invention illustrated.

The form of my invention illustrated in Figs. 1 to 3 is well adapted for use where the power to be transmitted through the universal joint is not great. If the service required of the joint is greater, the form shown in Figs. 6 and 7 may be used, while for the heaviest work of which the joint is capable, the form shown in Figs. 8 and 9 is recommended.

From the premises, it will be understood that motion transmitted to either the socket or ball member of my universal joint, as from shaft connected with it, will be transmitted to the other member, and that the two shafts contemplated need not be in line, it being necessary only that their axes intersect.

The universal joint has no projecting parts liable to catch the clothing or injure a person who may come into contact with it, and the joint may be readily disassembled by removing the detachable portion of the socket member. Finally, the hollow socket member in connection with the slot in the ball member, or with the slots and interior recess when the same is made hollow, form an internal cavity in which oil is retained to thus lubricate the surfaces of the joint which move in contact with one another.

Having thus described and explained my invention, I claim and desire to secure by Letters Patent:—

1. In a universal joint, a hollow socket member formed in two parts; a pin extending across said socket member and the ends of which lie in recesses formed in the inner surface of said socket member and terminating short of the exterior surface thereof; and a hollow ball member located within said socket member and having slots within which said pin lies when said parts are assembled; said hollow ball and socket members forming an internal oil containing cavity.

2. In a universal joint, a hollow socket member provided with a detachable portion; a pin, the length of which is less than the diameter of said socket member, extending across said socket member, and the ends of which are held in place between said socket member and the detachable portion thereof; and a ball within said socket member, and having a slot, within which said pin lies when the parts are assembled.

3. In a universal joint, a hollow socket member provided with a detachable portion in threaded engagement therewith and with two oppositely located internal recesses; a pin extending across said socket member and the ends of which lie within said recesses and are engaged and held in place by said detachable portion; and a ball member located within said socket member and having a slot within which said pin lies when the parts are assembled.

Signed at Chicago Heights in the county of Cook and State of Illinois this 13th day of April A. D. 1911.

GEORGE H. BRUSH.

Witnesses:
WALTER SCHMIMKE,
EMMETT RICHARDS.